(12) United States Patent
Polyakov

(10) Patent No.: US 10,049,274 B1
(45) Date of Patent: Aug. 14, 2018

(54) SYSTEMS AND METHODS FOR PROVIDING EARTH OBSERVATION DATA AND ANALYTICS

(71) Applicant: EOS DATA ANALYTICS, INC., Menlo Park, CA (US)

(72) Inventor: Maxym Polyakov, Menlo Park, CA (US)

(73) Assignee: EOS DATA ANALYTICS, INC., Menlo Park, CA (US)

( * ) Notice: Subject to any disclaimer, the term of this patent is extended or adjusted under 35 U.S.C. 154(b) by 0 days.

(21) Appl. No.: 15/937,562

(22) Filed: Mar. 27, 2018

Related U.S. Application Data

(60) Provisional application No. 62/540,087, filed on Aug. 2, 2017, provisional application No. 62/477,718, filed on Mar. 28, 2017.

(51) Int. Cl.
*G06K 9/00* (2006.01)
*G06F 17/30* (2006.01)
*G06K 9/62* (2006.01)
*G06N 3/04* (2006.01)

(52) U.S. Cl.
CPC ..... *G06K 9/0063* (2013.01); *G06F 17/30268* (2013.01); *G06K 9/627* (2013.01); *G06N 3/04* (2013.01)

(58) Field of Classification Search
None
See application file for complete search history.

(56) References Cited

U.S. PATENT DOCUMENTS

2009/0271719 A1* 10/2009 Clare .................. G09B 29/007
715/762

* cited by examiner

*Primary Examiner* — Bernard Krasnic
(74) *Attorney, Agent, or Firm* — Georgiy L. Khayet

(57) ABSTRACT

Methods and systems for providing earth observation (EO) data and analytics are provided. An example method may include providing EO images of geographical areas of a pre-determined size. The EO images can be associated with geographical coordinates and an EO data type. The method may include providing a user interface to configure a use case query. The use case query may include a use case geographical area and a use case EO data type. The method may include determining, based on the use case query, a subset of the EO images overlapping with the use case geographical area and associated with the use case EO data type. The method may include generating, by the analysis module and based on the subset of the EO images, a resulting EO image corresponding to the use case geographical area and displaying, via a graphic user interface, the resulting EO image.

11 Claims, 7 Drawing Sheets

500

```
┌─────────────────────────────────────────────┐
│ Provide, by an EO image classification module, one or more EO │
│ images of geographical areas of a pre-determined size, the one │
│ or more EO images being associated with geographical │
│ coordinates and at least one EO data type │
│ 505 │
└─────────────────────────────────────────────┘
                      ↓
┌─────────────────────────────────────────────┐
│ Provide, by a workbench module, a user interface to configure a │
│ use case query, wherein the use case query includes at least one │
│ use case geographical area and at least one use case EO data │
│ type │
│ 510 │
└─────────────────────────────────────────────┘
                      ↓
┌─────────────────────────────────────────────┐
│ Determine, by an analysis module and based on the use case │
│ query, a subset of the one or more EO images, wherein at least │
│ one EO image of the subset overlaps with the at least one use │
│ case geographical area and associated with the at least one use │
│ case EO data type │
│ 515 │
└─────────────────────────────────────────────┘
                      ↓
┌─────────────────────────────────────────────┐
│ Generate, by the analysis module and based on the subset of the │
│ one or more EO images, a resulting EO image corresponding to │
│ the at least one use case geographical area │
│ 520 │
└─────────────────────────────────────────────┘
                      ↓
┌─────────────────────────────────────────────┐
│ Display, by a visualization module via a graphic user interface, │
│ the resulting EO image │
│ 525 │
└─────────────────────────────────────────────┘
```

SYSTEMS AND METHODS FOR PROVIDING EARTH OBSERVATION DATA AND ANALYTICS

CROSS-REFERENCE TO RELATED APPLICATIONS

This application claims the benefit of U.S. provisional patent application Ser. No. 62/477,718 filed Mar. 28, 2017, entitled "Systems and Methods for Provisioning an Atlas for Earth Observation Analytics" and U.S. provisional patent application Ser. No. 62/540,087 filed Aug. 2, 2017, entitled "Providing Earth Observation Imagery Data". The subject matter of aforementioned applications is incorporated herein by reference in its entirety for all purposes.

TECHNICAL FIELD

This disclosure generally relates to processing of data. More particularly, this disclosure relates to methods and systems for providing earth observation (EO) imagery data and analytics.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Satellite and other EO data are used for applications in business, science, and public policy. Currently, EO imagery data providers generate EO imagery data in minimum size areas (for example, 625 km2 "scenes"). Therefore, customers are required to purchase these minimum size "scenes" from providers, even if the customers are only interested in an EO image of a geographical area of a smaller size. Moreover, if the geographical area of interest overlaps with multiple minimum size "scenes" offered by providers, customers are required to purchase all of the overlapping "scenes." Another shortcoming of existing EO imagery providers is that most of the industry satellite providers still employ manual ordering processes, which results in several weeks of handling an order for an EO image. Ordering a larger than required EO image and long delivery times leads to wasteful and expensive transactions for customers. Yet another shortcoming of existing EO imagery providers is that software programmers and data scientists need to develop a software code in response to each new use case for analytics of the EO data.

SUMMARY

This section introduces a selection of concepts in a simplified form that are further described in the Detailed Description section, below. This summary does not identify key or essential features of the claimed subject matter and is not intended to be an aid in determining the scope of the claimed subject matter.

This present disclosure is directed to systems and methods for providing Earth Observation (EO) data and analytics. Embodiments of the present disclosure may facilitate acquiring, by customers, EO images of areas of interests. Some embodiments of the disclosure may provide a user interface for configuring a use case queries for performing analytics on the EO images.

According to one example embodiment, a system for providing EO data and analytics is provided. The system may include an EO image classification module configured to provide one or more EO images of geographical areas of a pre-determined size. The one or more EO images can be associated with geographical coordinates and at least one EO data type. The system may include a workbench module configured to provide a user interface to configure a use case query. The use case query may include at least one use case geographical area and at least one use case EO data type. The system may further include an analysis module configured to determine, based on the use case query, a subset of the one or more EO images, wherein at least one EO image from the subset overlaps with the at least one use case geographical area and associated with the at least one use case EO data type. The analysis module can be further configured to generate, based on the subset of the one or more EO images, a resulting EO image corresponding to the at least one use case geographical area. The system may include a visualization module configured to display, via a graphic user interface, the resulting EO image.

The EO image classification module can be configured to acquire EO imagery data from one or more EO providers. The EO imagery data can be divided into geographical areas of a provider size and associated with provider EO data type. The provider size can be larger than the pre-determined size. The EO image classification module can be configured to divide the EO imagery data into the geographical areas of the pre-determined size to obtain the one or more EO images. The EO image classification module can be configured to associate the one or more EO images with the geographical coordinates of the geographical areas and the provider EO data type.

The EO imagery data from the one or more EO providers may include satellites EO image data, aerial EO image data, and drones EO image data. The EO data type may include optical, multispectral, hyperspectral, synthetic aperture radar data, and point cloud data.

The use case query may further include at least one analytical operation to be performed on the one or more EO images. The analysis module can be further configured to execute at least one analytical operation on the subset of the one or more EO images to obtain the resulting EO image. The at least one analytical operation includes a mathematical operation. The at least one analytical operation may also include feeding the subset of the one or more EO images to one or more pre-trained artificial neural networks to obtain the resulting EO image. The at least one analytical operation includes at least one of: a change detection, an object recognition, a surface displacement determination, and a spectral imagery analytic operation.

The system may further include a use case data base. The use case data base can include at least one entry containing a classification code from a list of classification codes according to an industry business vertical classification, a use case query documentation, a list of analytical operations of the use case query, a list of EO data types of the use case query, and at least one business rule. The business rule can be operable to create at least one relationship between the use case query, the analytical operations of the use case query, and the EO data types of the use case query.

The workbench module can be further configured to add, based on the use case query, a new entry in the use case database. The system may include an atlas module configured to analyze the use case database to determine connections between the EO data types and the classification codes.

The atlas module may be further configured to generate at least one graphical representation of the connections.

According to another example embodiment, a method for providing earth observation (EO) data and analytics is provided. The method may include providing, by an EO image classification module, one or more EO images of geographical areas of a pre-determined size. The one or more EO images can be associated with geographical coordinates and at least one EO data type. The method may further include providing, by a workbench module, a user interface to configure a use case query. The use case query can include at least one use case geographical area and at least one use case EO data type. The method may further include determining, by an analysis module and based on the use case query, a subset of the one or more EO images. At least one EO image from the subset can overlap with the at least one use case geographical area and associated with the at least one use case EO data type. The method may include generating, by the analysis module and based on the subset of the one or more EO images, a resulting EO image corresponding to the at least one use case geographical area. The method may further include displaying, by a visualization module via a graphic user interface, the resulting EO image.

The at least one EO type may include optical data, multispectral data, hyperspectral data, synthetic aperture radar data, and point cloud data. The use case query may further include at least one analytical operation to be performed on the one or more EO images. The method may further include executing, by the analysis module the at least one analytical operation on the subset of the one or more EO images to obtain the resulting EO image. The at least one analytical operations includes at least one of: a change detection, an object recognition, a surface displacement determination, and a spectral imagery analytic operation.

The method may further include adding, by the workbench module and based on the use case query, a new entry to a use case database. The use case data base can include at least one entry comprising a classification code from a list of classification codes according to an industry business vertical classification, a use case query documentation, a list of analytical operations of the use case query, a list of EO data types of the use case query, and at least one business rule. The at least one business rule can be operable to create at least one relationship between the use case query, analytical operations of the use case query, and the EO data types of the use case query.

The method may further include analyzing, by an atlas module, the use case database to determine connections between the EO data types and the classification codes. The method may further include generating, by the atlas module, at least one graphical representation of the connections.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

FIG. 5 is flow chart showing a method for providing EO data and analytics, according to an example embodiment of the present disclosure

DETAILED DESCRIPTION OF EXAMPLE EMBODIMENTS

Figure 1:
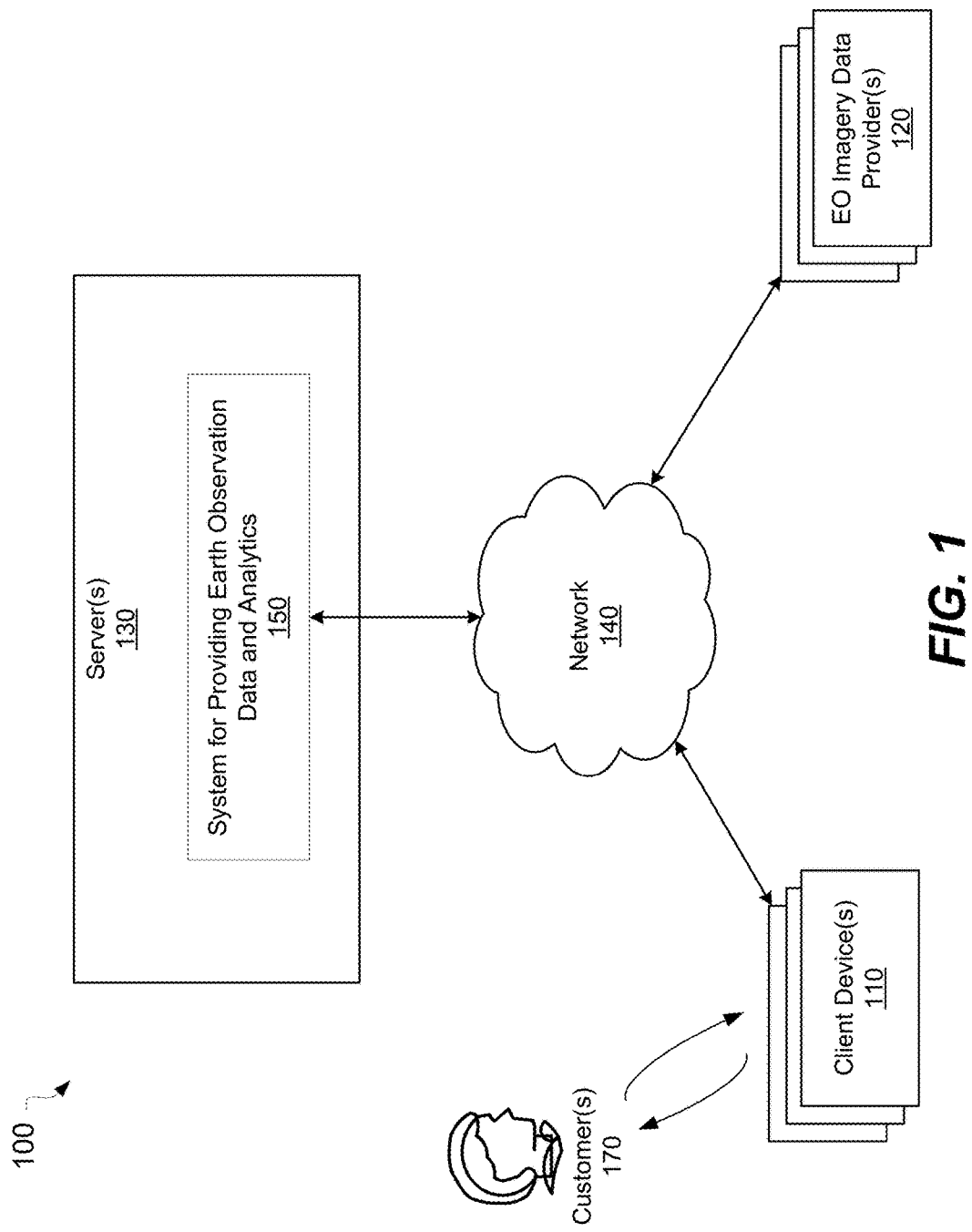
FIG. 1 is a block diagram of an example environment, wherein method for providing EO data and analytics can be implemented.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The technology described herein is concerned with systems and methods for providing EO data and analytics. Some embodiments of the present technology may facilitate acquiring of EO imagery data by customers. Certain embodiments may provide customers with an instant access to the EO imagery data, the ability to pay only for required area of interest, and eliminating manual ordering processes of EO imagery data. Some embodiments may provide an effective search for images of required area of interests by attributes, for example by EO image type, date, cloud cover, sun angle, and so forth. Certain embodiments may facilitate generating use case queries for EO image data and saving the use case queries for later reuse and modification and by so obviating the need for software programmers and data scientists to develop software code in response to each new use case. Some embodiments of the present disclosure may analyze the use case queries to establish connections between the use cases, analytical operations, and type of data required for the analytical operations.

According to an example embodiment of the present disclosure, a method for providing EO data and analytics may include providing, by an EO image classification module, one or more EO images of geographical areas of a pre-determined size. The one or more EO images can be associated with geographical coordinates and at least one EO data type. The method may further include providing, by a workbench module, a user interface to configure a use case query. The use case query can include at least one use case geographical area, at least one use case EO data type, and at least one analytical operation. The method may further include determining, by an analysis module and based on the use case query, a subset of the one or more EO images. At least one EO image from the subset can overlap with the at least one use case geographical area and be associated with the at least one use case EO data type. The method may include executing, by the analysis module and based, the at least one analytical operation on the subset of the one or more EO images to obtain a resulting EO image corresponding to the at least one use case geographical area. The method may include displaying, by a visualization module via a graphic user interface, the resulting EO image.

Referring now to the drawings, FIG. 1 shows an example environment 100, wherein a method for providing EO data and analytics can be implemented. The environment 100 may include one or more client device(s) 110 and one or more server(s) 130. The one or more server(s) 130 may include a system 150 for providing EO data and analytics. The client device(s) 110 and the server(s) 130 may be connected via network 140.

The client device(s) 110 may include a personal computer, a laptop computer, tablet computer, smartphone, mobile phone, Internet phone, netbook, set top box, multimedia player, personal digital assistant, server computer, network storage computer, entertainment system, infotainment system, television device, display, or any other computing device comprising at least networking and data processing capabilities.

The server(s) 130 may include a standalone computing device. In some other embodiments, the server(s) 130 may be implemented as a cloud-based computing resource shared by multiple users. The cloud-based computing resource(s) can include hardware and software available at a remote location and accessible over the network 140. The cloud-based computing resource(s) can be dynamically re-allocated based on demand. The cloud-based computing resources may include one or more server farms/clusters including a collection of computer servers which can be co-located with network switches and/or The network 140 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, packet switching communications network, circuit switching communications network), Bluetooth radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks.

The customer(s) 170 may access the system 150 using one or more applications of the client device, for example a web browser. The customer(s) may configure, using the system 150, a use case query. The use case query may include geographical coordinates of an area of interest, one ore more types of EO data, a workflow, and analytical operations to be performed on the EO image data. The system 150 may be further configured to process the use case query to generate a resulting EO image. The system 150 may be further configured to display the resulting EO image on the client device(s) 110.

The system 150 may be configured to receive EO imagery data from one or more provider(s) 120. The EO imagery data can be obtained using images taken from satellites, drones, and airplanes. The EO imagery data can be pre-processed by the provider(s) 120. The pre-processing may include orthorectifying, mosaicking, tiling, and so forth. The EO imagery data may include optical data, multispectral data, hyperspectral data, synthetic aperture radar data, and point cloud data.

Figure 2:
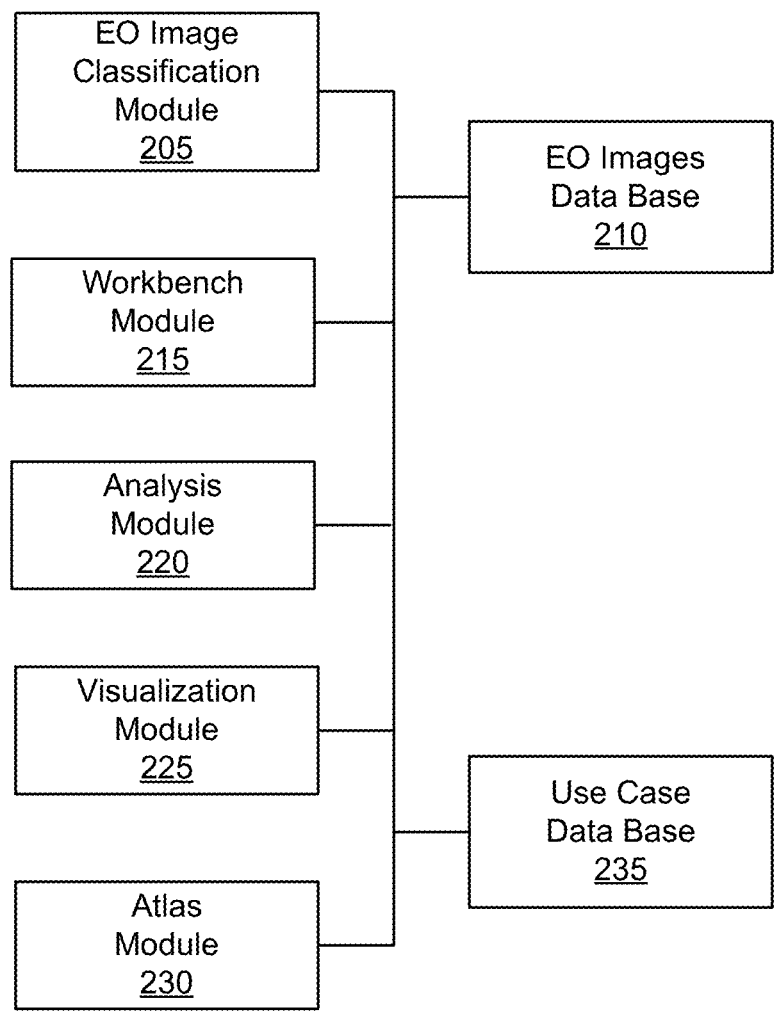
FIG. 2 is a block diagram of a system for providing EO data and analytics, according to example embodiments of the present disclosure.

FIG. 2 is a block diagram showing the system 150 for providing EO data and analytics, according to an example embodiment of the present disclosure. The system 150 may include EO image classification module 205, a EO images data base 210, a workbench module 215, an analysis module 220, a visualization module 225, an atlas module 230, and a use case data base 235. In some embodiments, modules of the system 150 may be implemented in program instructions to be executed on the server(s) 130.

The EO image classification module 205 may be configured to acquire EO imagery data from provider(s) 120. The EO imagery data can be provided in minimum size areas ("scenes") of a minimum size determined by the provider(s) 120 (for example, 625 km$^2$). The EO image classification module 205 may be further configured to divide the "scenes" into pieces to obtain one or more EO images of a pre-determined size. The pre-determined size can be smaller than the minimum size of the "scenes" received from provider(s) 120. The EO images can be further stored into the EO images data base 210.

The EO image classification module 205 can be further configured to associate the EO images with one or more attributes. The attributes may include geographical coordinates. In certain embodiments, each pixel of the EO images can be assigned with the geographical coordinates.

Additionally, the EO images can be associated with other attributes including, but not limited to, a type of EO data, position of a satellite providing the "scene," a position of the sun, a presence or absence of clouds in the piece of the "scene," a time, date, and year the "scene" was obtained, a season of a year, provider's name, and so forth. The attributes can be used for a quick search of required EO image in the EO images data base 210.

The workbench module 215 may be configured to provide a user interface for configuring, by customer(s) 170, a use case query. The customer(s) 170 may use the user interface (via the client device(s) 110) to select geographical coordinates of an area of interest, EO data types, and other attributes of EO images, analytic operations to be performed on EO images, a workflow for performing the analytical operations, and by so to configure the use case query. The query may further include one or more business rules for selecting EO data types and geospatial operations to be performed on the EO images.

The workbench module 215 can be further configured to save the use case query into the use case data base 235. In some embodiments, the workbench module 215 may be configured to add a new entry in the use case data base 235. The new entry may include a classification code of a use case query according to an industry business vertical classification, a use case query documentation, a list of analytical operations of the use case query, a list of EO data types of the use case query, business rules determining relationship between the use case query, the analytical operations, and the EO data types.

The analysis module 220 can be configured to process the use case query to generate a resulting EO image. The visualization module 225 can be configured to display, via a graphic user interface, the resulting EO image. The analysis module 220 can be configured to select a subset of EO images from the EO images data base 210. The subset may include the EO images that overlap with an area of interest specified by geographical coordinates in the use case query.

The EO images can be originated from "scenes" of a single provider 120 or "scenes" of different multiple provider(s) 120.

Figure 3:
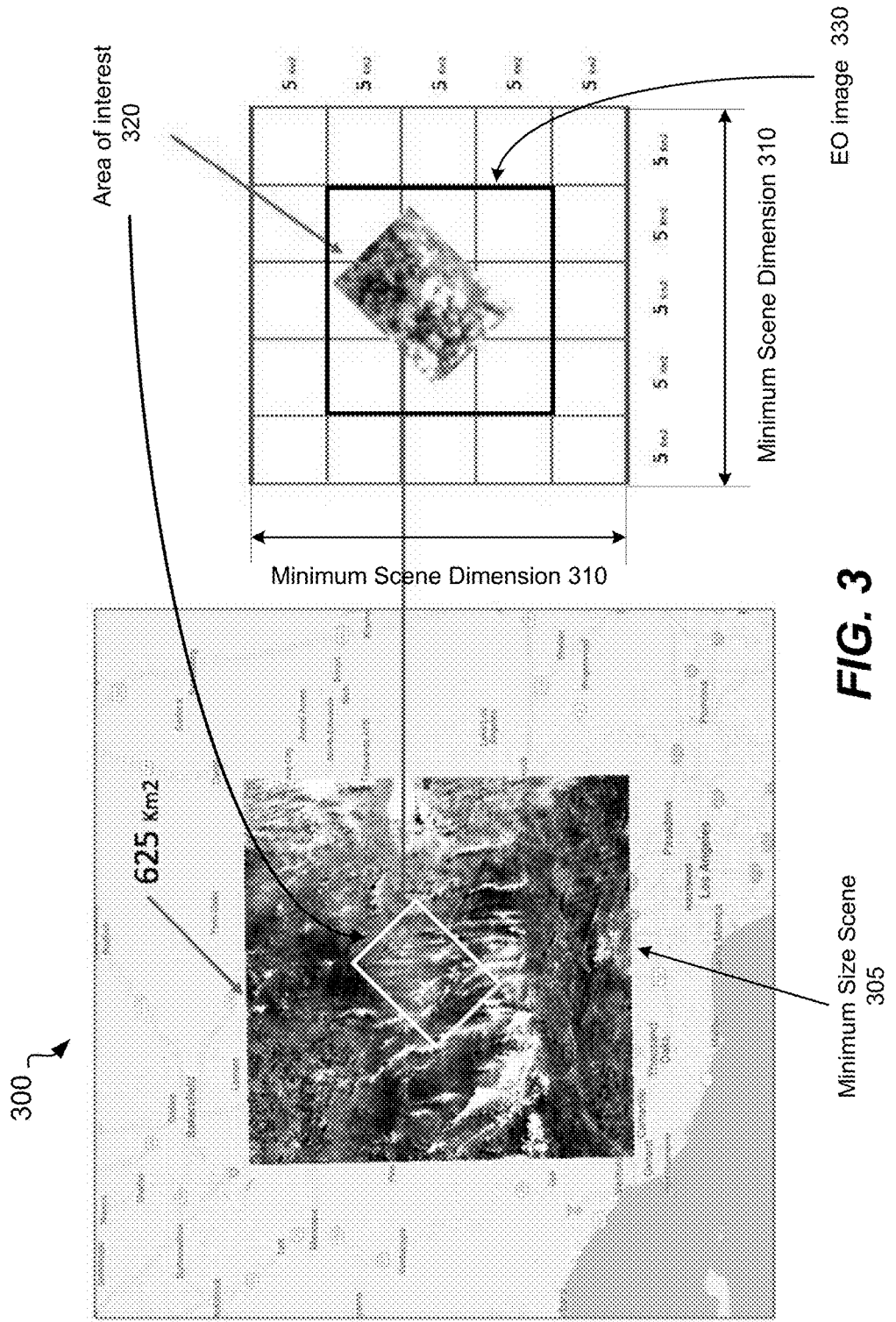
FIG. 3 depicts an example plot of EO imagery data and an area requested by a use case query, according to an example embodiment.

FIG. 3 depicts an example plot 300 of EO imagery data, according to an example embodiment. Numeral 305 denotes a minimum size area ("scene") that can be purchased directly from provider(s) 120. In the example of FIG. 3, a dimension 310 of the minimum size "scene" is 25 km rendering 625 km$^2$ for area of the "scene." In a use case query, customer(s) 170 may request an area of interest 320 of a smaller area or dimensions than the minimum size "scene" 305. In the example of FIG. 3, the area of interest 320 has area of 128 km$^2$. As seen from FIG. 3, only 9 pieces of the minimum size "scene" 305 touch the area of interest 320. Accordingly, a subset of EO images 330 from EO images data base that covers the area of interest 320, has an area 225 km$^2$, which is less than the area of minimum size "scene" 305. As a result, customer(s) 170 does not need to purchase the entire "scene" 305 from provider(s) 120 and to pay for parts of the "scene" 305 outside of the subset of EO image 330.

The analysis module 220 can be further configured to execute the analytical operations on the subset of the EO images. The analytical operations can be specific to a type of the EO images. The analytical operations may include one ore mathematical operations on the EO images. The analytical operations can also include feeding the EO images to a pre-trained artificial neural network to obtain the resulting EO image. The analytical operations may include, but not limited to a change detection, an object recognition, a surface displacement determination, and a spectral imagery analytic operation.

The atlas module 230 may be configured to analyze the use case data base 235 to determine connections between classification codes of the use case queries according to an industrial business vertical classification, types of EO data used in the use case queries, and analytical operations of the use case queries. The atlas module 230 may be further configured to generate one or more graphical representations of the connections.

Figure 4:
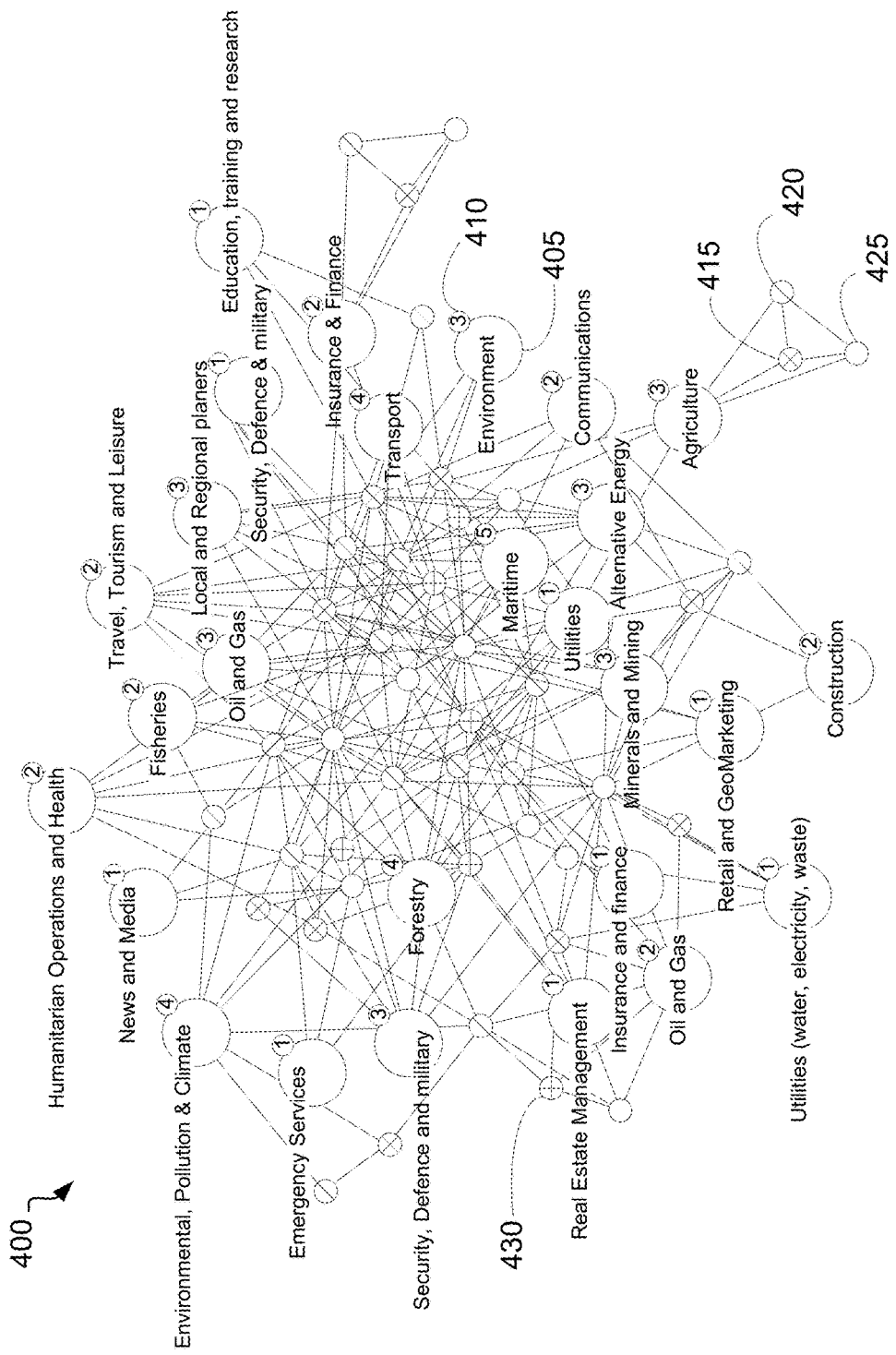
FIG. 4 depicts an example graphical representation of connections between use cases and EO data types, according to an example embodiment of the present disclosure.

FIG. 4 depicts an example graphical representation 400 of connections between classification codes and EO data types, according to an example embodiment of the present disclosure. The graphical representation 400 may include one or more circles 405 of a large size for depicting different industries of different classification codes according to one of industrial business vertical classifications. The graphical representation 400 may include titles for the various industries. The graphical representation 400 may further include one or more circles 415, 420, 425, and 430 of a small size for depicting different types of EO data. The circles 405 and the circles 415, 420, 425, and 430 can be connected to show types of EO data used in specific industries. The graphical representation 400 may further include the circles 410 attached to the circles 405. The circles 410 may include number of use case queries in the use case data base 235 which currently generated for the industry and shared by customer(s) 170. In some embodiments, customer(s) 170 may click on the one of the circles 410 to review the list of the generated use case queries. Customer(s) 170 may further select a use case query for further modification in the workbench module 215 to develop a new use case query. The atlas module 230 can be further configured to reanalyze the connections in the use case data base 235 each time a new use case query is added.

FIG. 5 is a process flow diagram showing a method 500 for providing EO imagery data and analytics, according to an example embodiment of the present disclosure. The operations of method 500 may be embedded in program instructions of a computer system 700 described in FIG. 7.

The method 500 may commence, in block 505, with providing, by an EO image classification module, one or more EO images of geographical areas of a pre-determined size. The one or more EO images can be associated with geographical coordinates and at least one EO data type. The EO data may include optical data, multispectral data, hyperspectral data, synthetic aperture radar data, and point cloud data. The EO data can include a satellite data, aerial data, and drone data.

In block 510, the method 500 may include providing, by a workbench module, a user interface to configure a use case query. The use case query may include at least one use case geographical area and at least one use case EO data type. The use case query may further include at least one analytical operation to be performed on the EO images.

In block 515, the method 500 may include determining, by an analysis module and based on the use case query, a subset of the one or more EO images. At least one EO image from the subset overlaps with the at least one use case geographical area and is associated with the at least one use case EO data type.

In block 520, the method 500 may include generating, by the analysis module and based on the subset of the one or more EO images, a resulting EO image corresponding to the at least one case geographical area. In some embodiments, the method 500 may further include executing, by the analysis module, the at least one analytical operation on the subset of the one or more EO images to obtain the resulting EO image. In block 525, the method 500 may include displaying, by a visualization module via a graphic user interface, the resulting EO image.

Figure 6:
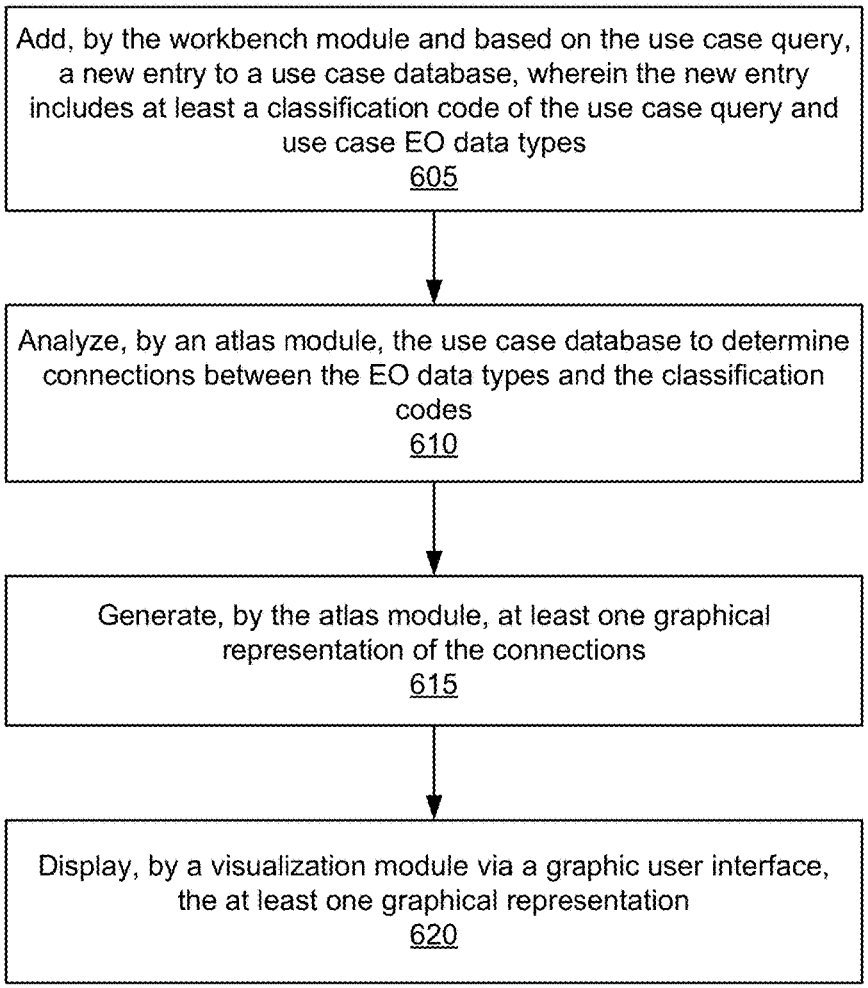
FIG. 6 is a flow chart showing a method for providing an atlas of EO data analytics, according to an example embodiment.

FIG. 6 is a flow chart showing a method 600 a method for providing an atlas of EO data analytics, according to an example embodiment. The method 600 may be a continuation of the method 500 of FIG. 5. The method 600 may commence, in block 605, with adding, by the workbench module and based on the use case query, a new entry to a use case database. The new entry includes at least a classification code of the use case query and use case EO data types. In some embodiments, the new entry may include analytical operations of the use case query.

In block 610, the method 600 may include analyzing, by an atlas module, the use case database to determine connections between the EO data types and classification codes. In some embodiments, the method 600 may include determination of connections between the classification codes and the analytical operations.

In block 615, the method 600 may include generating, by the atlas module, at least one graphical representation of the connections. In block 620, the method 600 may include displaying, by the visualization module, the at least one graphical representation. An example of the graphical representation of the connections between classification codes (industries) and the types of EO data is shown in FIG. 4.

Figure 7:
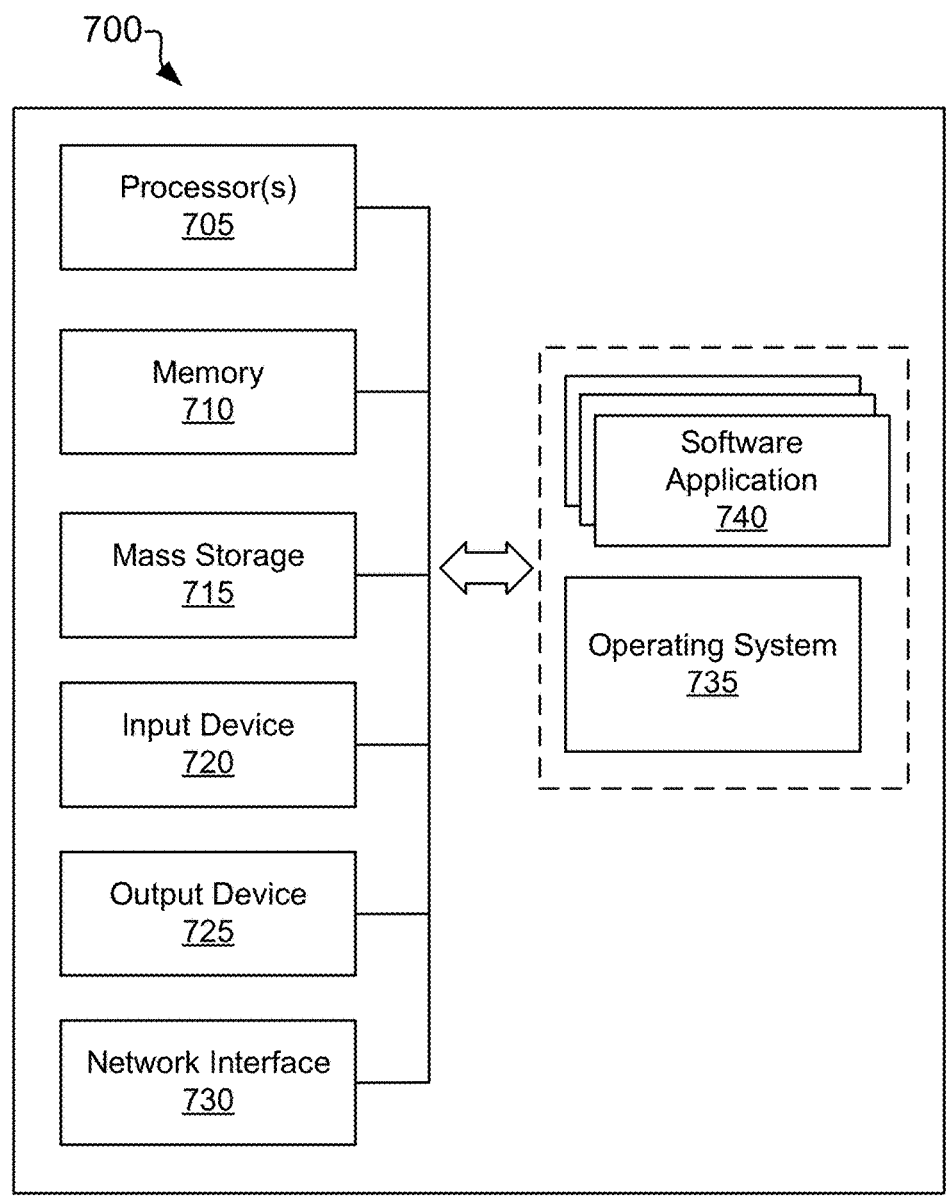
FIG. 7 is a high-level block diagram illustrating an example computer system, within which a set of instructions for causing the machine to perform any one or more of the methodologies discussed herein can be executed.

FIG. 7 is a high-level block diagram illustrating an example computer system 700, within which a set of instructions for causing the machine to perform any one or more of the methodologies discussed herein can be executed. The computer system 700 may include, refer to, or be an integral part of, one or more of a variety of types of devices, such as a general-purpose computer, desktop computer, laptop computer, tablet computer, netbook, mobile phone, smartphone, personal digital computer, smart television device, server, among others. In some embodiments, the computer system 700 is an example of client device(s) 110 or server(s) 130. Notably, FIG. 7 illustrates just one example of the computer system 700 and, in some embodiments, the computer system 700 may have fewer elements/modules than shown on FIG. 7 or more elements/modules than shown on FIG. 7.

The computer system 700 includes one or more processors 705, a memory 710, one or more storage devices 715, one or more input devices 720, one or more output devices 725, and network interface 730. One or more processors 705 are, in some examples, configured to implement functionality and/or process instructions for execution within the computer system 700. For example, the processors 705 may process instructions stored in memory 710 and/or instructions stored on storage devices 715. Such instructions may include components of an operating system 735 or software applications 740. Computer system 700 may also include one or more additional components not shown in FIG. 7, such as a housing, power supply, battery, global positioning system (GPS) receiver, and so forth.

Memory 710, according to one example, is configured to store information within the computer system 700 during operation. Memory 710, in some example embodiments, may refer to a non-transitory computer-readable storage medium or a computer-readable storage device. In some examples, memory 710 is a temporary memory, meaning that a primary purpose of memory 710 may not be long-term storage. Memory 710 may also refer to a volatile memory, meaning that memory 710 does not maintain stored contents when memory 710 is not receiving power. Examples of volatile memories include random access memories (RAM), dynamic random access memories (DRAM), static random access memories (SRAM), and other forms of volatile memories known in the art. In some examples, memory 710 is used to store program instructions for execution by the processors 705. Memory 710, in one example, is used by software (e.g., the operating system 735 or applications 740). Generally, software applications 740 refer to software applications suitable for implementing at least some operations of the methods for providing a location-based gaming experience as described herein.

One or more storage devices 715 can also include one or more transitory or non-transitory computer-readable storage media and/or computer-readable storage devices. In some embodiments, storage devices 715 may be configured to store greater amounts of information than memory 710. Storage devices 715 may further be configured for long-term storage of information. In some examples, the storage devices 715 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 7, the computer system 700 may also include one or more input devices 720. The input devices 720 may be configured to receive input from a user through tactile, audio, video, or biometric channels. Examples of input devices 720 may include a keyboard, keypad, mouse, trackball, touchscreen, touchpad, microphone, one or more video cameras, image sensors, fingerprint sensors, or any other device capable of detecting an input from a user or other source, and relaying the input to computer system 700, or components thereof.

The output devices 725, in some examples, may be configured to provide output to a user through visual or auditory channels. Output devices 725 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. Output devices 725 may also include a touchscreen, presence-sensitive display, or other input/output capable displays known in the art.

The computer system 700, in some example embodiments, also includes network interface 730. The network interface 730 can be utilized to communicate with external devices via one or more data networks such as one or more wired, wireless, or optical networks including, for example, the Internet, intranet, LAN, WAN, cellular phone networks, Bluetooth radio, and an IEEE 802.11-based radio frequency network, among others. The network interface 730 may be a network interface card, such as an Ethernet card, an optical transceiver, a radio frequency transceiver, or any other type of device that can send and receive information.

The operating system 735 may control one or more functionalities of computer system 700 and/or components thereof. For example, the operating system 735 may interact with the applications 740 and may facilitate one or more interactions between the applications 740 and components of the computer system 700. As shown in FIG. 7, the operating system 735 may interact with or be otherwise coupled to the application(s) 740 and components thereof. In some embodiments, application(s) 740 may be included in operating system 735. In these and other examples, virtual modules, firmware, or software may be part of the applications 740.

Thus, method of and systems for providing EO data and analytics have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for providing earth observation (EO) data and analytics, the system comprising:
    an EO image classification module configured to provide one or more EO images of geographical areas of a pre-determined size, the one or more EO images being associated with geographical coordinates and at least one EO data type;
    a workbench module configured to:
        provide a user interface to configure a use case query, wherein the use case query includes at least one use case geographical area, at least one use case EO data type, and at least one analytical operation;
        add, based on the use case query, a new entry to a use case database, the use case database including at least one entry containing:
            a classification code selected from a list of classification codes according to an industry business vertical classification;
            a use case query documentation;
            a list of analytical operations of the use case query;
            a list of EO data types of the use case query; and
            at least one business rule configured to create at least one relationship between the use case query, the analytical operations of the use case query, and the EO data types of the use case query;
    an analysis module configured to:

determine, based on the use case query, a subset of the one or more EO images, wherein at least one EO image from the subset of the one or more EO images overlaps with the at least one use case geographical area and is associated with the at least one use case EO data type; and generate, based on the subset of the one or more EO images, a resulting EO image corresponding to the at least one use case geographical area;

execute the at least one analytical operation on the subset of the one or more EO images to obtain the resulting EO image;

a visualization module configured to display, via a graphic user interface, the resulting EO image; and an atlas module configured to analyze the use case database to:

determine connections between the EO data types, the analytical operations, and the classification codes; and generate at least one graphical representation of the connections for display via the graphic user interface.

2. The system of claim 1, wherein the EO image classification module is configured to:

acquire EO imagery data from one or more EO providers, the EO imagery data being divided into geographical areas of a provider size and associated with provider EO data type, the provider size being larger than the pre-determined size;

divide the EO imagery data into the geographical areas of the pre-determined size to obtain the one or more EO images; and associate the one or more EO images with the geographical coordinates of the geographical areas and the provider EO data type.

3. The system of claim 2, wherein the EO imagery data from the one or more EO providers include one or more of: satellites EO image data, aerial EO image data, and drones EO image data.

4. The system of claim 1, wherein the at least one EO data type includes one of optical data, multispectral data, hyperspectral data, synthetic aperture radar data, and point cloud data.

5. The system of claim 1, wherein the at least one analytical operation includes a mathematical operation.

6. The system of claim 1, wherein the at least one analytical operation includes feeding the subset of the one or more EO images to one or more pre-trained artificial neural networks to obtain the resulting EO image.

7. The system of claim 1, wherein the at least one analytical operation includes at least one of: a change detection, an object recognition, a surface displacement determination, and a spectral imagery analytic operation.

8. A method for providing earth observation (EO) data and analytics, the method comprising:

providing, by an EO image classification module, one or more EO images of geographical areas of a pre-determined size, the one or more EO images being associated with geographical coordinates and at least one EO data type;

providing, by a workbench module, a user interface to configure a use case query, wherein the use case query includes at least one use case geographical area, at least one use case EO data type, and at least one analytical operation;

adding, by the workbench module and based on the use case query, a new entry to a use case database, the use case database including at least one entry containing:
a classification code selected from a list of classification codes according to an industry business vertical classification;
a use case query documentation;
a list of analytical operations of the use case query;
a list of EO data types of the use case query; and
at least one business rule configured to create at least one relationship between the use case query, the analytical operations of the use case query, and the EO data types of the use case query;

determining, by an analysis module and based on the use case query, a subset of the one or more EO images, wherein at least one EO image from the subset of the one or more EO images overlaps with the at least one use case geographical area and is associated with the at least one use case EO data type;

generating, by the analysis module and based on the subset of the one or more EO images, a resulting EO image corresponding to the at least one use case geographical area;

executing, by the analysis module, the at least one analytical operation on the subset of the one or more EO images to obtain the resulting EO image;

displaying, by a visualization module via a graphic user interface, the resulting EO image; and analyzing, by an atlas module, the use case database to determine connections between the EO data types, the analytical operations, and the classification codes; and generating, by the atlas module, at least one graphical representation of the connections for display via the graphic user interface.

9. The method of claim 8, wherein the at least one EO data type includes one or more of optical data, multispectral data, hyperspectral data, synthetic aperture radar data, and point cloud data.

10. The method of claim 8, wherein the at least one analytical operation includes at least one of: a change detection, an object recognition, a surface displacement determination, and a spectral imagery analytic operation.

11. A system for providing earth observation (EO) data and analytics, the system comprising:

an EO image classification module configured to provide one or more EO images of geographical areas of a pre-determined size, the one or more EO images being associated with geographical coordinates and at least one EO data type;

a workbench module configured to:

provide a user interface to configure a use case query, wherein the use case query includes at least one use case geographical area, at least one use case EO data type, and at least one analytical operation;

add, based on the use case query, a new entry to a use case database, the use case database including at least one entry containing:
a classification code selected from a list of classification codes according to an industry business vertical classification;
a use case query documentation;
a list of analytical operations of the use case query;
a list of EO data types of the use case query; and
at least one business rule configured to create at least one relationship between the use case query, the analytical operations of the use case query, and the EO data types of the use case query;

an analysis module configured to:
  determine, based on the use case query, a subset of the one or more EO images, wherein at least one EO image from the subset of the one or more EO images overlaps with the at least one use case geographical area and is associated with the at least one use case EO data type; and
  execute the at least one analytical operation on the subset of the one or more EO images to obtain the resulting EO image;
a visualization module configured to display, via a graphic user interface, the resulting EO image; and
an atlas module configured to analyze the use case database to:
  determine connections between the EO data types, the analytical operations, and the classification codes; and
  generate at least one graphical representation of the connections for display via the graphic user interface.

* * * * *